(12) United States Patent
Knoll et al.

(10) Patent No.: US 11,623,536 B2
(45) Date of Patent: *Apr. 11, 2023

(54) AUTONOMOUS SEAGOING POWER REPLENISHMENT WATERCRAFT (71) Applicant: X Development LLC, Mountain View, CA (US)

(72) Inventors: Matthew Aaron Knoll, Mountain View, CA (US); Neil Davé, San Mateo, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/808,838

(22) Filed: Jun. 24, 2022

(65) Prior Publication Data

US 2023/0064908 A1 Mar. 2, 2023

Related U.S. Application Data

(63) Continuation of application No. 17/464,075, filed on Sep. 1, 2021.

(51) Int. Cl.
*B60L 53/30* (2019.01)
*B60L 53/62* (2019.01)
(Continued)

(52) U.S. Cl.
CPC .............. *B60L 53/30* (2019.02); *B60L 53/16* (2019.02); *B60L 53/51* (2019.02); *B60L 53/52* (2019.02);
(Continued)

(58) Field of Classification Search
None
See application file for complete search history.

(56) References Cited

U.S. PATENT DOCUMENTS 3,934,531 A * 1/1976 Allen ...................... B63B 35/70
114/63
6,167,831 B1 1/2001 Watt et al.
(Continued)

FOREIGN PATENT DOCUMENTS

CL 2019000039 A1 3/2019
CN 203691007 7/2014
(Continued)

OTHER PUBLICATIONS

Extended Search Report in European Appln. No. 22151132.2, dated May 2, 2022, 10 pages.
(Continued)

*Primary Examiner* — Daniel L Greene
(74) *Attorney, Agent, or Firm* — Fish & Richardson P.C.

(57) ABSTRACT

Methods, systems, and computer-readable media that implement autonomous seagoing power replenishment watercraft. An example system includes a plurality of marine vessels; a plurality of watercraft, each watercraft of the plurality of watercraft including a rechargeable electrical power supply and being configured to operate in: a first mode in which the watercraft awaits an assignment to provide electrical energy to a marine vessel of the plurality of marine vessels; a second mode in which the watercraft performs operations including keeping station with an assigned marine vessel and providing electrical energy to the assigned marine vessel from the power supply; and a third mode in which the watercraft recharges the power supply from a charging station. The system includes a controller configured to perform operations comprising: transmitting, to a first watercraft, an instruction indicating an assignment of the first watercraft to provide electrical energy to a first marine vessel.

20 Claims, 4 Drawing Sheets

(51) Int. Cl.
| | |
|---|---|
| *B60L 53/52* | (2019.01) |
| *B60L 53/51* | (2019.01) |
| *B60L 53/57* | (2019.01) |
| *B63B 35/44* | (2006.01) |
| *H02J 7/00* | (2006.01) |
| *B60L 53/16* | (2019.01) |
| *B63B 79/40* | (2020.01) |
| *G05D 1/02* | (2020.01) |
| *G05D 1/00* | (2006.01) |
| *H02J 7/35* | (2006.01) |

(52) U.S. Cl.
CPC .............. *B60L 53/57* (2019.02); *B60L 53/62* (2019.02); *B63B 35/44* (2013.01); *B63B 79/40* (2020.01); *G05D 1/0088* (2013.01); *G05D 1/0206* (2013.01); *H02J 7/0042* (2013.01); *B60L 2200/32* (2013.01); *B63B 2035/446* (2013.01); *B63B 2035/4453* (2013.01); *B63B 2035/4466* (2013.01); *H02J 7/35* (2013.01)

(56) References Cited

U.S. PATENT DOCUMENTS

| | | | |
|---|---|---|---|
| 6,354,235 B1* | 3/2002 | Davies | B63B 21/56 |
| | | | 440/33 |
| 6,515,375 B1 | 2/2003 | Beal | |
| 7,249,568 B1* | 7/2007 | Cultrara | B63B 29/02 |
| | | | 114/361 |
| 8,808,041 B2 | 8/2014 | Hine et al. | |
| 9,988,129 B2 | 6/2018 | Jamieson et al. | |
| 10,725,469 B2 | 7/2020 | Harnett et al. | |
| 10,856,520 B1 | 12/2020 | Kozachenok et al. | |
| 11,397,087 B1* | 7/2022 | Mishra | G01C 21/203 |
| 2002/0078873 A1* | 6/2002 | Fisher | B63B 3/08 |
| | | | 114/260 |
| 2010/0047041 A1* | 2/2010 | Johnson | B64B 1/00 |
| | | | 414/803 |
| 2010/0320759 A1* | 12/2010 | Lightfoot | F03B 13/20 |
| | | | 290/53 |
| 2011/0281478 A1* | 11/2011 | Blumenthal | B63B 35/44 |
| | | | 440/49 |
| 2011/0282807 A1* | 11/2011 | Colello | G06Q 50/06 |
| | | | 320/128 |
| 2012/0005031 A1* | 1/2012 | Jammer | G06Q 50/06 |
| | | | 705/16 |
| 2012/0005125 A1* | 1/2012 | Jammer | G06Q 10/04 |
| | | | 705/412 |
| 2012/0038210 A1 | 2/2012 | Kibbee | |
| 2012/0158229 A1* | 6/2012 | Schaefer | B60L 53/665 |
| | | | 320/109 |
| 2012/0242275 A1* | 9/2012 | Kokusho | H02S 20/00 |
| | | | 136/246 |
| 2012/0249077 A1 | 10/2012 | Carmel | |
| 2012/0271758 A1* | 10/2012 | Jammer | B60L 53/68 |
| | | | 701/22 |
| 2014/0110527 A1* | 4/2014 | Sing | B64C 39/024 |
| | | | 244/118.1 |
| 2014/0232200 A1* | 8/2014 | Maekawa | H02J 7/0042 |
| | | | 307/104 |
| 2015/0217837 A1* | 8/2015 | Szydlowski | B63B 25/12 |
| | | | 114/74 R |
| 2015/0219404 A1* | 8/2015 | Pietsch | B60T 1/10 |
| | | | 165/10 |
| 2015/0294329 A1* | 10/2015 | Saito | G06Q 30/0261 |
| | | | 705/7.31 |
| 2016/0225105 A1* | 8/2016 | Hill | G06Q 50/06 |
| 2016/0363671 A1* | 12/2016 | Anderson | G01C 21/14 |
| 2017/0015397 A1* | 1/2017 | Mitchell | H01M 50/249 |
| 2018/0107210 A1* | 4/2018 | Harnett | G05D 1/0038 |
| 2018/0354591 A1 | 12/2018 | Burt et al. | |
| 2019/0061885 A1 | 2/2019 | Baro et al. | |
| 2019/0228218 A1 | 7/2019 | Barnaby et al. | |
| 2019/0340440 A1 | 11/2019 | Atwater et al. | |
| 2020/0107524 A1 | 4/2020 | Messana et al. | |
| 2020/0155882 A1 | 5/2020 | Tohidi et al. | |
| 2020/0262305 A1 | 8/2020 | Chakraborty et al. | |
| 2020/0282857 A1 | 9/2020 | Mortensen et al. | |
| 2020/0288678 A1 | 9/2020 | Howe et al. | |
| 2020/0406765 A1* | 12/2020 | Mikalsen | B60L 53/14 |
| 2021/0221476 A1* | 7/2021 | Szydlowski | B63B 35/285 |
| 2021/0300507 A1* | 9/2021 | Corcoran | B63H 23/26 |
| 2021/0380007 A1* | 12/2021 | Merritt | B60L 53/53 |
| 2021/0383485 A1* | 12/2021 | Markham | G06Q 10/0831 |
| 2022/0111752 A1* | 4/2022 | Hoeven | B63H 21/17 |
| 2022/0122464 A1* | 4/2022 | Franklin | G08G 3/00 |
| 2022/0153393 A1* | 5/2022 | Jiang | B63H 19/00 |

FOREIGN PATENT DOCUMENTS

| | | |
|---|---|---|
| CN | 108040948 | 5/2018 |
| EP | 2244934 | 11/2010 |
| EP | 3484283 | 5/2019 |
| JP | 2002171853 | 6/2002 |
| KR | 20100065542 | 6/2010 |
| NO | 300401 | 5/1997 |
| NO | 20160199 | 8/2017 |
| WO | WO 2009/008733 | 1/2009 |
| WO | WO 2009/097057 | 8/2009 |
| WO | WO 2012/081990 | 6/2012 |
| WO | WO 2014/179482 | 11/2014 |
| WO | WO 2017/137896 | 8/2017 |
| WO | WO 2018/011744 | 1/2018 |
| WO | WO 2018/011745 | 1/2018 |
| WO | WO 2019/002881 | 1/2019 |
| WO | WO 2019/121851 | 6/2019 |
| WO | WO 2019/182300 | 9/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2021/030237 | 2/2021 |
| WO | WO 2022/010815 | 1/2022 |
| WO | WO 2020/072438 | 4/2022 |

OTHER PUBLICATIONS

International Preliminary Report on Patentability in International Appln. No. PCT/US2020/059829, dated May 27, 2022, 11 pages.
International Search Report and Written Opinion in International Appln No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln. No. PCT/US2022/022250, dated Jul. 6, 2022, 15 pages.
International Search Report and Written Opinion in International Appln. No. PCT/US2022/022492, dated Jun. 28, 2022, 13 pages.
International Search Report and Written Opinion in International Appln. No. PCT/US2022/022589, dated Jul. 7, 2022, 12 pages.
International Search Report and Written Opinion in International Appln. No. PCT/US2022/023831, dated Jul. 8, 2022, 13 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
PCT International Search Report and Written Opinion in International Appln. No. PCT/US2020/059829, dated Feb. 25, 2021, 18 pages.
Qiu et al., "Improving Transfer Learning and Squeeze-and-Excitation Networks for Small-Scale Fine-Grained Fish Image Classification," IEEE Access, Dec. 2018, 6(31):78503-78512, 10 Pages.
shipinsight.com [online], "Wartsila to develop autonomous container barge for Rotterdam as part of MAGPIE Project," May 27, 2021, retrieved on Aug. 31, 2021, retrieved from URL<https://

(56) References Cited

OTHER PUBLICATIONS shipinsight.com/articles/wartsila-to-develop-autonomous-container-barge-for-rotterdam-as-part-of-magpie-project/>, 2 pages.

Stein et al., "Consistent melanophore spot patterns allow long-term individual recognition of Atlantic salmon Salmo Salar," Journal of Fish Biology, Nov. 2017, 91(6):1699-1712, 14 Pages.

International Search Report and Written Opinion in International Appln. No. PCT/US2022/033067, dated Oct. 27, 2022, 44 pages.

\* cited by examiner

AUTONOMOUS SEAGOING POWER REPLENISHMENT WATERCRAFT

CROSS-REFERENCE TO RELATED APPLICATIONS

This application is a continuation of and claims the benefit under 35 U.S.C. § 120 of U.S. application Ser. No. 17/464,075, filed Sep. 1, 2021, the contents of which are incorporated by reference herein.

BACKGROUND OF THE INVENTION

This specification relates to control systems for seagoing power replenishment watercraft.

Long haul cargo ships are heavy polluters. Pollution produced by cargo ships could be reduced by powering cargo ships with batteries. However, powering cargo ships with batteries can be inefficient due to the large sizes and weights of batteries that would be needed to power a cargo ship throughout an ocean transit. Additionally, batteries typically require long recharging times, which could cause delays in shipping schedules when recharging is performed in port. Battery-powered cargo ships are also at risk of fire and explosion due to the potential for thermal runaway in batteries that are subjected to heat.

SUMMARY OF THE INVENTION

This specification describes techniques, methods, systems, and other approaches for controlling autonomous seagoing power replenishment watercraft. The autonomous seagoing power replenishment watercraft can intercept battery-powered cargo ships along their travel routes, and recharge cargo ship batteries during transit.

An autonomous replenishment watercraft can include a power supply including battery banks for charging batteries of marine vessels, e.g., cargo ships. The autonomous replenishment watercraft can power the marine vessels as the marine vessels transit waterways. The watercraft can be, for example, barges that are configured for autonomous piloting. The watercraft can be self-powered and capable of autonomously docking with floating charging stations in order to recharge their power supplies.

In an example, a watercraft receives, from a controller, an assignment to charge a power supply of a marine vessel. After receiving the assignment, the watercraft autonomously takes station on the marine vessel and connects a discharge port of the watercraft's power supply with a charging port of the marine vessel's power supply. The power supply of the watercraft charges the marine vessel by transferring electrical energy to the power supply of the marine vessel. The watercraft can keep station with the marine vessel and continue to charge the power supply of the marine vessel for a duration of time, e.g., of minutes or hours. In some examples, the watercraft can continue to charge the power supply of the marine vessel for a travel distance, e.g., of nautical miles, or tens, hundreds, or thousands of nautical miles.

When the watercraft completes charging the marine vessel, the watercraft can disconnect from the marine vessel. In some examples, after a first watercraft disconnects from the marine vessel, a second watercraft connects to the marine vessel. The first watercraft then returns to the charging station to recharge the power supply from the charging station. The marine vessel can continue to disconnect and reconnect with a series of watercraft during a voyage, e.g., a voyage across an ocean or other body of water.

Among other advantages, implementations may reduce environmental impacts of cargo ships while improving operational efficiency, energy efficiency, and safety of the cargo ships. By receiving electrical energy from a series of watercraft, a marine vessel such as a cargo ship can transit across oceans primarily using electricity from batteries. Charging the batteries at sea can improve operational efficiency since the marine vessel can continue to travel along shipping routes while charging from the watercraft. This can reduce recharging and/or refueling time required in port and can increase availability of land-based refueling stations.

In some cases, the watercraft carrying the batteries can recharge from photovoltaic, tidal, and/or wind powered charging stations. Thus, the watercraft and marine vessels can be powered using a sustainable energy source, improving energy efficiency and reducing environmental impacts.

Because the batteries of the marine vessel can be regularly recharged during transit, the batteries can be smaller than would be necessary for powering the marine vessel for an entire voyage. Thus, the batteries can be lighter and can occupy a smaller volume of space in the marine vessel. Lighter, smaller batteries can enable the marine vessel to travel at faster speeds and carry more cargo. Carrying lighter and smaller batteries can also improve safety of the marine vessel due to a reduced risk of fire and explosion caused by thermal runaway.

The watercraft carrying the power supplies can be repaired and replaced with minimal impacts to shipping routes or schedules. For example, when a battery bank carried by a first watercraft reaches its end of life, the first watercraft can autonomously navigate to a maintenance facility where the battery bank can be replaced. Other watercraft can continue to charge marine vessels while the first watercraft undergoes maintenance.

In some cases, the marine vessel can include a diesel-electric propulsion system. The diesel-electric propulsion system can enable the marine vessel to alternate between transiting on diesel power and on battery power. Thus, the marine vessel can continue to travel even when the batteries are depleted.

In general, innovative aspects of the subject matter described in this specification can be embodied in a watercraft including a rechargeable electrical power supply, the watercraft being configured to operate in: a first mode in which the watercraft awaits an assignment to provide electrical energy to a marine vessel; a second mode in which the watercraft performs operations including: keeping station with an assigned marine vessel; and providing electrical energy to the assigned marine vessel from the power supply; and a third mode in which the watercraft recharges the power supply from a charging station.

These and other implementations can include the following features, alone or in combination. In some implementations, the watercraft is configured to transition from the first mode to the second mode upon receiving an instruction assigning the watercraft to provide electrical energy to a marine vessel.

In some implementations, the watercraft is configured to transition from the second mode to the third mode after discharging the power supply to the marine vessel.

In some implementations, the watercraft is configured to transition from the third mode to the first mode after recharging the power supply from the charging station.

In some implementations, providing electrical energy to the assigned marine vessel includes: connecting a discharge port of the power supply to a charge port of the marine vessel; determining that a power level of the power supply drops to a first threshold power level; and in response to determining that the power level of the power supply drops to the first threshold power level, disconnecting the discharge port of the power supply from the charge port of the marine vessel.

In some implementations, recharging the power supply from the charging station includes: autonomously navigating the watercraft to a location of the charging station; connecting a charge port of the power supply to a discharge port of the charging station; determining that a power level of the power supply rises to a second threshold power level; and in response to determining that the power level of the power supply rises to the second threshold power level, disconnecting the charge port of the power supply from the discharge port of the charging station.

In some implementations, the watercraft includes a linking system configured to couple a first link mechanism of the watercraft to a second link mechanism of the marine vessel while the watercraft provides the electrical energy to the marine vessel.

In some implementations, the marine vessel is configured to tow the watercraft while the watercraft provides the electrical energy to the marine vessel.

In some implementations, keeping station with the assigned marine vessel includes maintaining a consistent relative position between the watercraft and the marine vessel as the marine vessel transits through a body of water based on sensor data from the one or more sensors.

In some implementations, the power supply includes a first battery bank configured to power the watercraft and a second battery bank configured to provide electrical energy to the assigned marine vessel.

In general, other innovative aspects of the subject matter described in this specification can be embodied in a system including: a plurality of marine vessels; a plurality of watercraft, each watercraft of the plurality of watercraft including a rechargeable electrical power supply and being configured to operate in: a first mode in which the watercraft awaits an assignment to provide electrical energy to a marine vessel of the plurality of marine vessels; a second mode in which the watercraft performs operations including: keeping station with an assigned marine vessel; and providing electrical energy to the assigned marine vessel from the power supply; and a third mode in which the watercraft recharges the power supply from a charging station; and a controller configured to perform operations including: transmitting, to a first watercraft of the plurality of watercraft, an instruction indicating an assignment of the first watercraft to provide electrical energy to a first marine vessel of the plurality of marine vessels.

These and other implementations can include the following features, alone or in combination. In some implementations, the operations include assigning the first watercraft to the first marine vessel based on a power level of the power supply of the first watercraft.

In some implementations, the operations include: tracking a location of each of the plurality of marine vessels; tracking a location of each watercraft; and assigning the first watercraft to provide electrical energy to the first marine vessel based on a current location of the first watercraft and a current location of the first marine vessel.

In some implementations, the operations include transmitting, to the first watercraft, instructions to transit to a first location for rendezvous with the first marine vessel.

In some implementations, the operations include assigning a second watercraft to provide electrical energy to the first marine vessel after the first watercraft provides electrical energy to the first marine vessel.

In some implementations, the operations include: determining a time duration for the first watercraft to provide electrical energy to the first marine vessel; predicting a location of the first marine vessel at an end of the time duration; and transmitting, to the second watercraft of the plurality of watercraft, an instruction to transit to a second location for rendezvous with the first marine vessel, the second location being based on the predicted location.

In some implementations, the charging station includes at least one of a waterborne solar powered charging station, a waterborne tidal powered charging station, or a waterborne wind powered charging station.

In some implementations, each watercraft includes a wireless communication module, the operations including transmitting the instruction to the wireless communication module of the first watercraft.

In some implementations, each wireless communication module is configured to enable communication between the watercraft and the controller and to enable communication between the watercraft and the marine vessels.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations are set forth in the accompanying drawings and the description, below. Other potential features and advantages of the disclosure will be apparent from the description and drawings, and from the claims).

BRIEF DESCRIPTION OF DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION OF THE INVENTION

Figure 1:
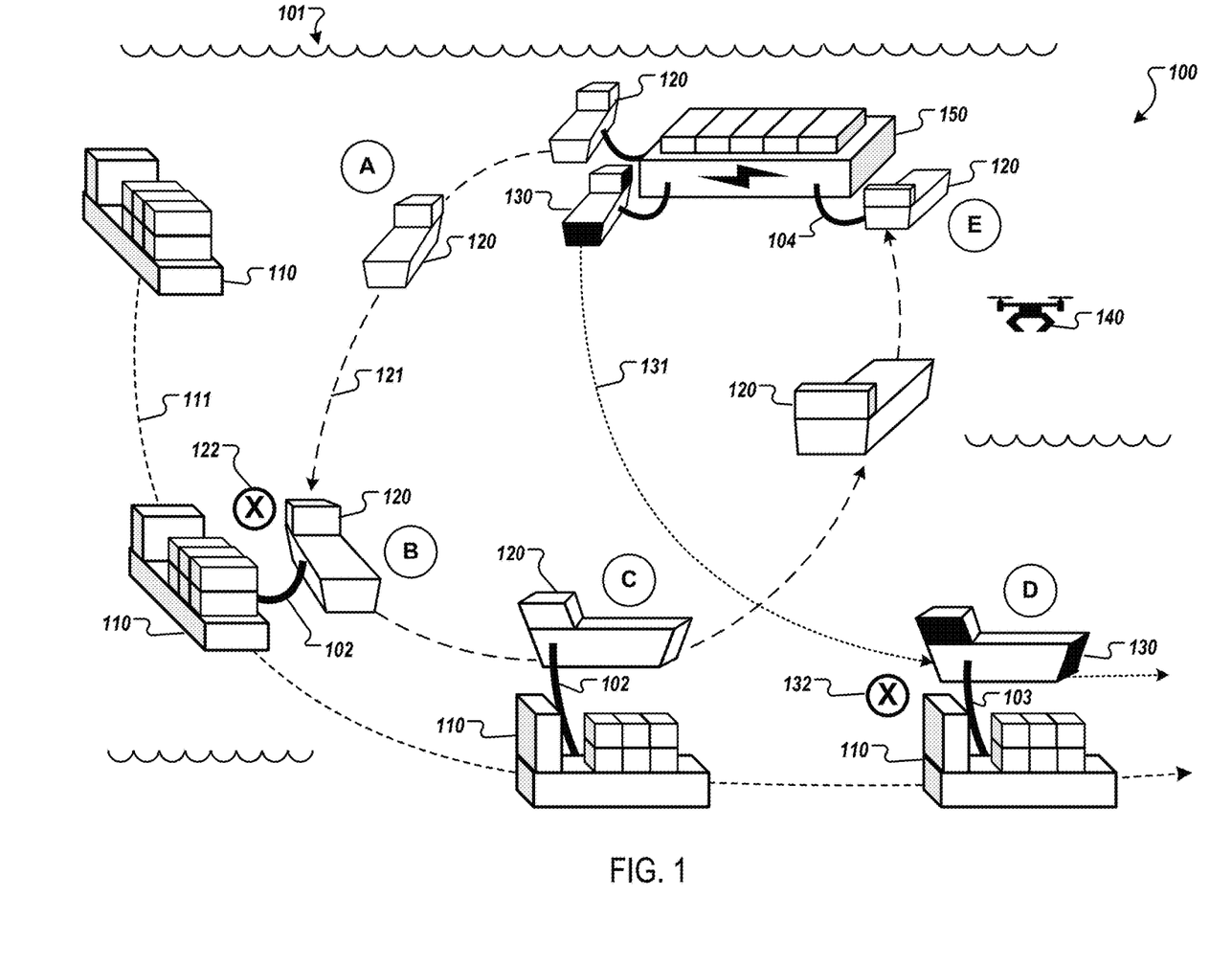
FIG. 1 is a diagram of an example system of watercraft that are configured to provide electrical energy to marine vessels.

FIG. 1 is a diagram of an example system 100 of watercraft that are configured to provide electrical energy to marine vessels. The system 100 includes watercraft 120, 130 that are each configured to mechanically link to marine vessel 110 and to provide electrical energy to marine vessel 110. The watercraft 120, 130 can be watercraft that are self-propelled. In some examples, the watercraft 120, 130 each include a rechargeable electrical power supply. The rechargeable electrical power supply can include, for example, a battery bank or multiple battery banks. In some examples, the watercraft 120 can be submersible.

The system 100 includes marine vessel 110. The marine vessel 110 can be one of multiple marine vessels. The marine vessel 110 can be electrically-powered and configured for autonomous piloting. The marine vessel 110 can be, for example, a cargo ship, a container ship, a cruise ship, a naval ship, a passenger ship, and/or another type of ship. The marine vessel 110 transits along route 111 through a body of water 101. The body of water 101 is an ocean, a sea, a lake, or another body of water.

The system 100 includes one or more charging stations, e.g., charging station 150. The charging station 150 can be a waterborne charging station. In some examples, the charging station 150 can be free-floating. In some examples, the charging station 150 can be self-propelled and configured for autonomous piloting. In some examples, the charging station 150 can be towed by a vessel. In some examples, the charging station 150 can be anchored or moored. In some examples, the charging station 150 can be land-based. The charging station 150 can generate electrical power, e.g., from solar energy, wind energy, or both. The charging stations 150 can be positioned along shipping routes of marine vessels. For example, the charging stations 150 can be positioned at intervals along major shipping routes or along a particular route to be traveled by the marine vessel 110.

The watercraft 120, 130 can have multiple modes. In some examples, before receiving instructions to provide electrical energy to marine vessel 110, the watercraft may be in a first mode. Upon receiving instructions to provide electrical energy to marine vessel 110, the watercraft can change modes from the first mode to a second mode. After providing electrical energy to marine vessel 110, the watercraft 120, 130 can change modes from the second mode to a third mode. Operations of the watercraft 120 in different modes are described in greater detail below.

The system 100 includes an aerial drone 140. In some examples, the watercraft 120, 130 can be configured to provide electrical energy to the drone 140. In some examples, the watercraft 120, 130 can be configured to provide electrical energy to various other electrically powered devices and structures, e.g., electrically powered aircraft, oil platforms, ocean farms, seasteads, sea bases, etc.

Figure 2:
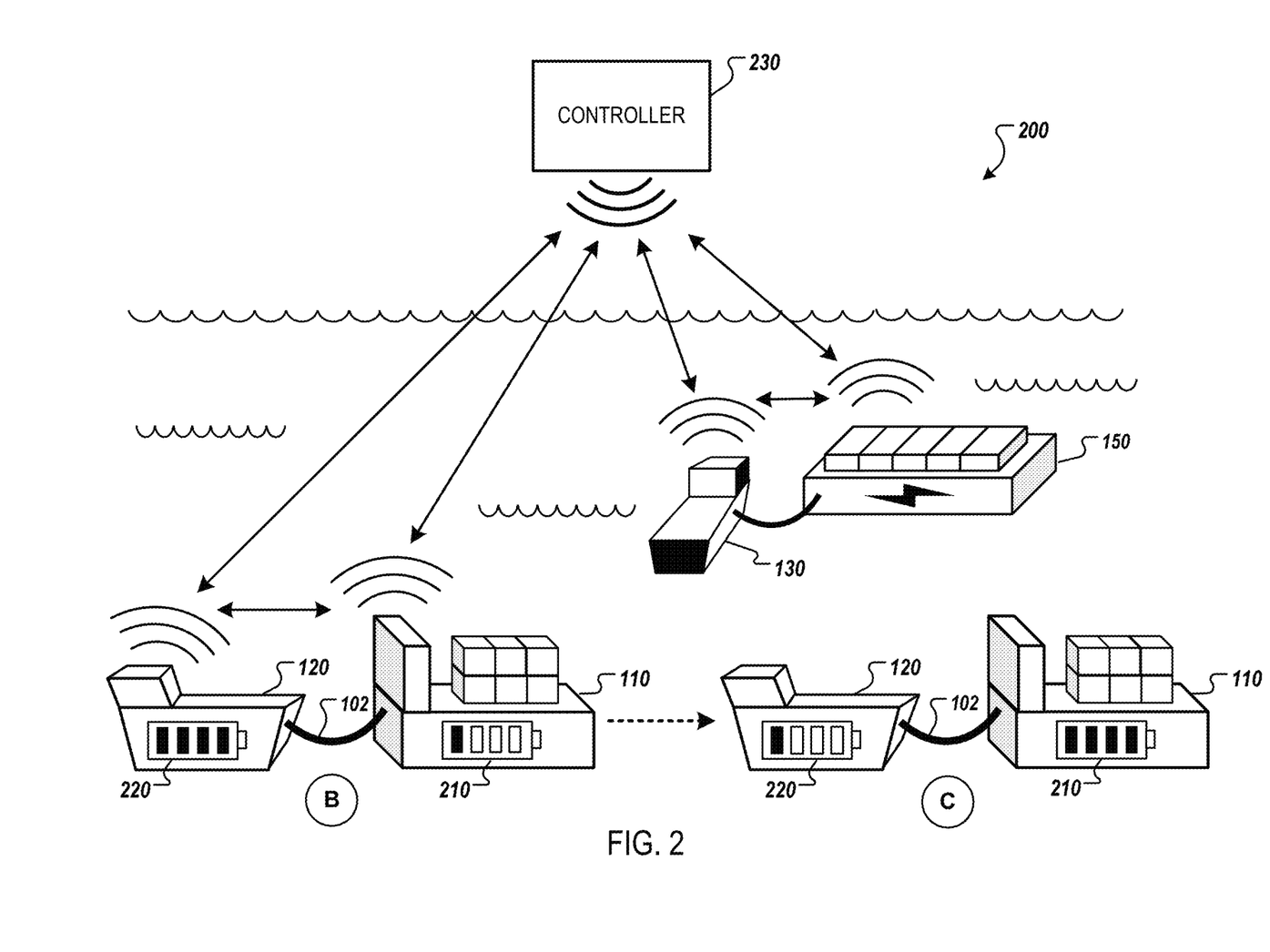
FIG. 2 is a diagram of an example communications and control system for autonomous seagoing power replenishment watercraft.

Operations of the system 100 can be controlled by a central control system. For example, FIG. 2 shows a diagram of an example central communications and control system 200 for autonomous seagoing power replenishment watercraft. Referring to FIG. 2, a controller 230 communicates with the watercraft 120, 130, the marine vessel 110, and the charging station 150 in order to control operations of the system 100.

The system 200 includes a controller 230 and autonomous seagoing power replenishment watercraft, e.g., watercraft 120. In some examples, each watercraft 120 includes a wireless communication module. Each wireless communication module can be configured to enable communication between the watercraft and the controller 230, and to enable communication between the watercraft and other watercraft.

The controller 230 can be a computing system that is capable of communicating wirelessly with the components of the autonomous seagoing power replenishment watercraft. In some examples, the controller 230 can be located remotely from the other components of the system 200. For example, the controller 230 may be located at a shipping port or other land location. In some examples, the controller 230 can be cloud-based.

The controller 230 can perform functions such as tracking and directing movement of the components of the system 200. The controller 230 can also direct operations of the components of the system 200, e.g., operations for mechanically and/or electrically linking watercraft 120 to marine vessel 110, for mechanically and/or electrically linking watercraft 120 charging stations 150, or mechanically and/or electrically linking watercraft 120 with other watercraft by engaging and disengaging link mechanisms of the watercraft.

In some examples, the controller 230 can determine an initial location of each watercraft, e.g., a location of the watercraft 120 prior to receiving instructions to provide electrical energy to the marine vessel 110. Each watercraft 120, 130 can include a wireless communication module for communicating with the controller 230 and with marine vessel 110. The controller 230 can receive, from each of the wireless communication modules, data indicating a location of the respective watercraft.

For example, the controller 230 can receive, from the wireless communication modules of each watercraft 120, 130, data indicating the geographic coordinate location of the watercraft. In some examples, the controller 230 can receive data indicating the location of the watercraft occasionally or at time intervals, e.g., once per minute, once per ten minutes, once per hour, etc. In some examples, the controller 230 can receive data indicating the location of the watercraft in response to sending a request to the watercraft. For example, upon determining that the power supply 210 of the marine vessel 110 needs to be charged, the controller 230 can perform a polling operation to poll each watercraft 120, 130 in order to obtain its current location.

In some examples, the controller 230 can use predictive analytics algorithms to predict marine vessel routes. The predictive analytics algorithms can receive, as input, data including, e.g., engineering specifications of a marine vessel, cargo weight, fuel and energy burn rates, weather conditions along a planned route, etc. The controller 230 can use the predictive analytics algorithms to predict locations of the marine vessel over time and to predict charging needs of a power supply 210 of the marine vessel 110. For example, the controller 230 can predict a location at which the power supply 210 of the marine vessel 110 will reach a minimum threshold power level. The controller 230 can also predict an amount of time needed to charge the power supply 210 from the minimum threshold power level to a full charge, and to predict a location of the marine vessel when the power supply 210 reaches a full charge.

The controller 230 can monitor or track a power level of each watercraft. The controller 230 can transmit, to a first watercraft, e.g., watercraft 120, an instruction indicating an assignment of the watercraft 120 to provide electrical energy to a first marine vessel, e.g., marine vessel 110. In some examples, the controller 230 can assign the watercraft 120 to the marine vessel 110 based on a power level of a power supply 220 of the watercraft 120. For example, the watercraft 120 may have a power level of ninety percent, and the watercraft 130 may have a power level of sixty percent. The controller 230 can assign the watercraft 120 to provide electrical energy to the marine vessel 110 based on the watercraft 120 having a higher power level than the watercraft 130.

The controller 230 can monitor or track a power level of each marine vessel. In some examples, the controller 230 can assign the watercraft 120 to the marine vessel 110 based on a power level of a power supply 220 of the marine vessel 110. For example, a first marine vessel, e.g., marine vessel 110, may have a power level of twenty percent, and a second marine vessel (not shown) may have a power level of fifty percent. The controller 230 can assign the watercraft 120 to provide electrical energy to the marine vessel 110 based on the marine vessel 110 having a lower power level than the second marine vessel.

The controller 230 can monitor or track a location of each watercraft and of each marine vessel. In some examples, the controller 230 can assign the watercraft 120 to the marine vessel 110 based on the location of the watercraft 120. For example, the watercraft 120 may have a location that is twenty nautical miles from the marine vessel 110, and the watercraft 130 may have a location that is thirty miles from the marine vessel 110. The controller 230 can assign the watercraft 120 to provide electrical energy to the marine vessel 110 based on the watercraft 120 being nearer in proximity to the marine vessel 110 than the watercraft 130.

In some examples, each watercraft 120, 130 includes a wireless communication module. The controller 230 can transmit instruction to the wireless communication modules of the watercraft. In some examples, the wireless communication module of a watercraft, e.g., watercraft 120, is configured to enable communication between the watercraft 120 and the controller 230 and to enable communication between the watercraft 120 and the marine vessel 110. The watercraft 120 is configured to receive an instruction through the wireless communication module that includes the assignment to provide electrical energy to the marine vessel 110.

Referring to FIG. 1, a process of autonomous seagoing power replenishment illustrated as stages (A) to (E). Stages (A) to (E) may occur in the illustrated sequence, or in a sequence that is different from the illustrated sequence. For example, some of the stages may occur concurrently. Stages (B) and (C) are illustrated in additional detail in FIG. 2.

In stage (A) of FIG. 1, the watercraft 120 has a high power level after charging the power supply 210 from the charging station 150. The watercraft 120 operates in a first mode in which the watercraft 120 awaits an assignment to provide electrical energy to a marine vessel.

The controller 230 can receive data indicating a route 111 of marine vessel 110. The controller 230 can receive the data, e.g., from a logistics or shipping organization. The controller 230 can also receive data indicating specifications of the marine vessel. For example, the specifications can include a distance and/or a time that the marine vessel 110 can travel before recharging. In some examples, the specifications can include a power discharge rate of the marine vessel.

Based on the data indicating the route 111 of the marine vessel 110, and based on the specifications of the marine vessel 110, the controller 230 can determine charging requirements of the marine vessel. For example, the controller 230 can estimate a predicted location of the marine vessel 110 when the marine vessel 110 requires charging, e.g., when a power level of the marine vessel 110 reaches a minimum allowable power level. The controller 230 can also determine an amount of power that the marine vessel 110 will require. Based on the amount of power that the marine vessel 110 will require, the controller 230 can determine a length of time and/or a length of distance that the marine vessel 110 will need to charge from the watercraft 120.

Based on the charging requirements of the marine vessel 110, the controller 230 can select one or more watercraft to provide electrical energy to the marine vessel 110. The controller 230 may track, control, and communicate with multiple watercraft. The controller 230 can select one or more of the watercraft to charge the marine vessel. In some examples, the controller 230 can select the one or more watercraft based on charging capabilities of the watercraft. For example, different watercraft can have different sizes, different connection types, different discharging speeds, different travel speeds, different travel ranges, etc. The controller 230 can select the one or more watercraft that have a size, discharging speed, connection type, travel speed, and travel range that satisfies the charging requirements of the marine vessel 110.

In some examples, the controller 230 can prioritize providing electrical energy to some marine vessels over providing electrical energy to other marine vessels. For example, the controller 230 may prioritize charging a first marine vessel that transports perishable goods over a second marine vessel that transports dry goods. The controller 230 can prioritize the first marine vessel by sending a first available watercraft to charge the first marine vessel, and a second available watercraft to charge the second vessel. In some examples, the controller 230 can prioritize the first marine vessel by sending a larger watercraft, a faster discharging watercraft, and/or a faster traveling watercraft, to charge the first marine vessel. The controller can send a smaller watercraft, a slower discharging watercraft, and/or a slower traveling watercraft, to charge the second marine vessel.

In the example of FIG. 1, the controller 230 selects watercraft 120 to provide electrical energy to the marine vessel 110 in the body of water 101. The controller 230 transmits an instruction to the wireless communication module of the watercraft 120 assigning the watercraft 120 to the marine vessel 110. The instruction can include navigation instructions that cause the watercraft 120 to transit to a location for rendezvous with the marine vessel 110, e.g., rendezvous point 122. The navigation instructions can include navigation waypoints, a geographic destination, a travel route, a target time of arrival, a travel speed, or any combination of these. Upon receiving the navigation instructions, the watercraft 120 can autonomously transit through the body of water 101 in accordance with the instructions.

In response to receiving the navigation instructions, the watercraft 120 transits along path 121 to the rendezvous point 122. The rendezvous point 122 can be a geographic position, e.g., defined by a latitude and longitude. The watercraft 120 can navigate to the rendezvous point using sensors of the watercraft 120, e.g., a global positioning system (GPS) sensor. The watercraft 120 can transition from the first mode to a second mode upon receiving the instruction assigning the watercraft 120 to provide electrical energy to the marine vessel 110.

In stage (B) of FIG. 1, the watercraft 120 operates in the second mode. The watercraft 120 navigates to the rendezvous point 122 with the marine vessel 110. The watercraft 120 can be configured to autonomously identify the marine vessel 110. For example, the watercraft 120 can include an image capture system and an image analysis system. The watercraft 120 can be configured to capture images of the marine vessel and to perform object recognition on the images. In some examples, the watercraft 120 can include imaging systems that are configured to recognize a marking on the marine vessel, such as an identifiable marking painted on the hull of the marine vessel.

In some examples, the watercraft 120 and the marine vessel 110 can communicate, e.g., through their respective wireless communication modules. For example, the marine vessel 110 can communicate its current GPS location, speed, and heading to the watercraft 120. The marine vessel 110 can also communicate, to the watercraft 120, information indicating a current power level of the power supply 210, a maximum power level of the power supply 210, a location of the charge port of the power supply 210, a type of charge port of the power supply 210, and/or other information.

After the watercraft 120 navigates to the rendezvous point 122, the watercraft 120 can take station with the marine vessel 110. For example, the watercraft 120 can position itself astern of the marine vessel 110 at a particular range, within a specified tolerance. In some examples, the watercraft 120 can position itself abeam of the marine vessel 110 at a particular range, within a specified tolerance. The range can be, for example, approximately thirty meters, approximately forty meters, approximately fifty meters, etc.

Upon taking station with the marine vessel 110, the watercraft 120 can keep station with the marine vessel 110. Keeping station with the marine vessel 110 can include maintaining a consistent relative position between the watercraft 120 and the marine vessel 110 as the marine vessel 110 transits through the body of water 101 along route 111. The watercraft 120 can maintain the consistent relative position with the marine vessel 110, e.g., based on sensor data from one or more sensors. The sensors can include, for example, radar range sensors, lidar sensors, image sensors, sonar sensors, etc.

The watercraft 120 can include a mechanical linking system configured to couple a first link mechanism of the watercraft to a second link mechanism of the marine vessel. In some examples, the watercraft 120 can mechanically link to the marine vessel 110 prior to providing electrical energy to the marine vessel. The watercraft 120 and the marine vessel 110 can remain mechanically linked while the watercraft provides the electrical energy to the marine vessel. In some examples, the marine vessel 110 is configured to tow the watercraft 120 through the linking system while the watercraft 120 provides electrical energy to the marine vessel 110. In some examples, the watercraft 120 can keep station with the marine vessel 110 such that little or no force is transmitted through the linking system.

The watercraft 120 can include a discharge port that is configured to connect to a charge port of the marine vessel 110. To charge the marine vessel 110, the watercraft 120 connects the discharge port of the power supply 220 to the charge port of the marine vessel 110. When the discharge port of the watercraft 120 is coupled to the charge port of the marine vessel 110, the power supply 220 of the watercraft 120 is in electrical continuity with the power supply 210 of the marine vessel 110. The power supply 220 of the watercraft 120 charges the power supply 210 of the marine vessel. In some examples, the discharge port can include or can be connected to a cable 102 that extends from the watercraft 120 to the marine vessel 110. In some examples, the cable 102 can be coupled to the mechanical linking system.

The watercraft 120 can provide electrical energy to the marine vessel 110 from the power supply 220 of the watercraft 120. As the watercraft 120 provides electrical energy to the marine vessel 110, the power level of the power supply 220 decreases. The power level of the power supply 210 may increase, decrease, or remain steady, depending on the amount of energy consumed by the marine vessel 110 while charging from the watercraft 120. The watercraft 120 can monitor the power level of the power supply 220 of the watercraft 120. In some examples, the watercraft 120 can transmit, to the controller 230, a power level of the power supply 220 while the watercraft 120 provides the electrical power to the marine vessel 110. The marine vessel 110 can also transmit, to the controller 230, a power level of a power supply 210 of the marine vessel. The controller 230 can track the power level of both the watercraft 120 and the marine vessel 110.

In some examples, while the watercraft 120 is linked to the marine vessel 110, the controller 230 can assign a second watercraft to provide electrical energy to the first marine vessel after the first watercraft provides electrical energy to the first marine vessel. For example, the controller 230 can select and assign a second watercraft, e.g., watercraft 130, to provide electrical energy to the marine vessel 110 after the watercraft 120 disconnects from the marine vessel 110. The controller 230 can transmit an instruction to the watercraft 130 that assigns the watercraft 130 to the marine vessel. The instruction can cause the watercraft 130 to transit to a rendezvous point 132 with the marine vessel 110. In response to receiving the instruction, the watercraft 130 can transit along the path 131 to the rendezvous point 132.

The controller 230 can select the rendezvous point 132 based on various factors. In some examples, the controller 230 can determine a time duration for the first watercraft to provide electrical energy to the first marine vessel, and predict a location of the first marine vessel at an end of the time duration. For example, the controller 230 can determine a time duration for the watercraft 120 to charge the marine vessel 110 of three hours, and can predict a location of the marine vessel 110 at the end of the three hours. The controller 230 can predict the location of the marine vessel 110 based on an initial location of the watercraft 120 and the marine vessel 110 and based on the speed of the watercraft 120 and the marine vessel 110. The controller 230 can determine the rendezvous point 132 based on the predicted position. For example, the rendezvous point 132 can be a location that is along the route 111 of the marine vessel, past the predicted location.

In some examples, the controller 230 can select the rendezvous point 132 based on the power level of the watercraft 120, the power level of the marine vessel 110, or both. As an example, the watercraft 120 can be configured to provide electrical energy to the marine vessel 110 until the watercraft 120 reaches a minimum threshold power level or until the marine vessel 110 reaches a maximum threshold power level, or whichever occurs first. When the watercraft 120 begins providing electrical energy to the marine vessel 110, the controller 230 can predict which will occur first, the watercraft 120 reaching the minimum power level or the marine vessel 110 reaching the maximum power level.

The minimum power level of the watercraft 120 can be, for example, twenty percent. In some cases, the minimum power level of the watercraft 120 can be based on a distance between the marine vessel 110 and the charging station 150. For example, the minimum power level of the watercraft 120 can be at least a power level that will permit the watercraft 120 to transit from the current position of the watercraft 120 to the location of the charging station 150. The maximum power level of the marine vessel 110 can be, for example, one hundred percent.

In an example, the controller 230 determines that the marine vessel 110 will reach the maximum power level after three hours of charging from the watercraft 120. Based on the location, the speed, and the direction of travel of the watercraft 120 and the marine vessel 110, the controller 230 can predict a location of the marine vessel 110 and the watercraft 120 when the marine vessel 110 reaches the maximum power level. The controller 230 can select the rendezvous point 132 based on the location of the marine vessel 110 and the watercraft 120 when the marine vessel 110 reaches the maximum power level.

In stage (C) of FIG. 1, the watercraft 120 disconnects from the marine vessel 110. In some examples, the watercraft 120 disconnects the discharge port of the power supply 220 from the charge port of the marine vessel 110 in response to the power level of the power supply 220 dropping to a first threshold power level, e.g., a minimum power level. In some examples, the watercraft 120 disconnects from the marine vessel 110 in response to the power supply 210 of the marine vessel 110 reaching a maximum power level. In some examples, a control system of the watercraft 120 can determine to disconnect the watercraft 120 from the marine vessel 110. In some examples, the controller 230 can transmit instructions to the watercraft 120 to disconnect from the marine vessel 110 based on a charge state of the watercraft 120, of the marine vessel 110, or both.

In some examples, the watercraft 120 can disconnect from the marine vessel 110 based on a schedule. For example, the controller 230 can transmit instructions to the watercraft 120 indicating a scheduled time that the watercraft 120 is to disconnect from the marine vessel 110. In some examples, the controller 230 can transmit instructions to the watercraft 120 indicating a scheduled location where the watercraft 120 is to disconnect from the marine vessel 110.

In some examples, the controller 230 can transmit instructions to the watercraft 120 to disconnect from the marine vessel based on the location of the watercraft 130. For example, when the watercraft 130 approaches within a certain range to the marine vessel 110, or within a certain range to the rendezvous point 132, the controller 230 can transmit an instruction to the watercraft 120 to cause the watercraft 120 to disconnect from the marine vessel 110.

The watercraft 120 can transition from the second mode to the third mode after discharging the power supply to the marine vessel. In the third mode, the watercraft 120 autonomously navigates along path 121 to return to the charging station 150 to recharge the power supply from the charging station 150. In some examples, the watercraft 120 can transit to a different charging station instead of returning to the same charging station 150. For example, the controller 230 can transmit instructions to the watercraft 120 to cause the watercraft 120 to transit to the nearest available charging station 150.

After the watercraft 120 departs from the marine vessel 110, the marine vessel 110 may travel independently along the route 111 from a location where the watercraft 120 detached from the marine vessel to the rendezvous point 132 with the watercraft 130.

In stage (D) of FIG. 1, the watercraft 130 connects to the marine vessel 110 and charges the marine vessel. At the rendezvous point 132, the watercraft 130 approaches the marine vessel 110 and takes station on the marine vessel 110. The watercraft 130 commences electrically charging the marine vessel 110 through cable 103.

In stage (E) of FIG. 1, the watercraft 120 recharges from the charging station 150. The watercraft 120 can autonomously dock at the charging station 150 and connect a charge port of the power supply 220 of the watercraft 120 to a discharge port of the charging station 150. The charge port of the power supply 220 can connect to the discharge port of the charging station 150, e.g., through cable 104.

As the watercraft 120 charges from the charging station 150, the watercraft 120 can monitor a power level of the power supply. When the watercraft 120 determines that a power level of the power supply has risen to a second threshold power level, the watercraft 120 can disconnect the charge port of the power supply from the discharge port of the charging station.

In some examples, the watercraft 120 can recharge from another watercraft. For example, after charging from the charging station 150, the watercraft 130 can charge the watercraft 120. In this way, the watercraft 120 can recharge without traveling all the way to the charging station. In some examples, the watercraft 130 can partially charge the watercraft 120 to a charge level that enables the watercraft 120 to travel to the charging station 150. Once the watercraft 120 arrives at the charging station 150, the charging station 150 can fully charge the watercraft 120. The watercraft 120 is configured to transition from the third mode to the first mode after recharging the power supply from the charging station 150. In the first mode, the watercraft 120 awaits another assignment to provide electrical energy to a marine vessel.

Figure 3:
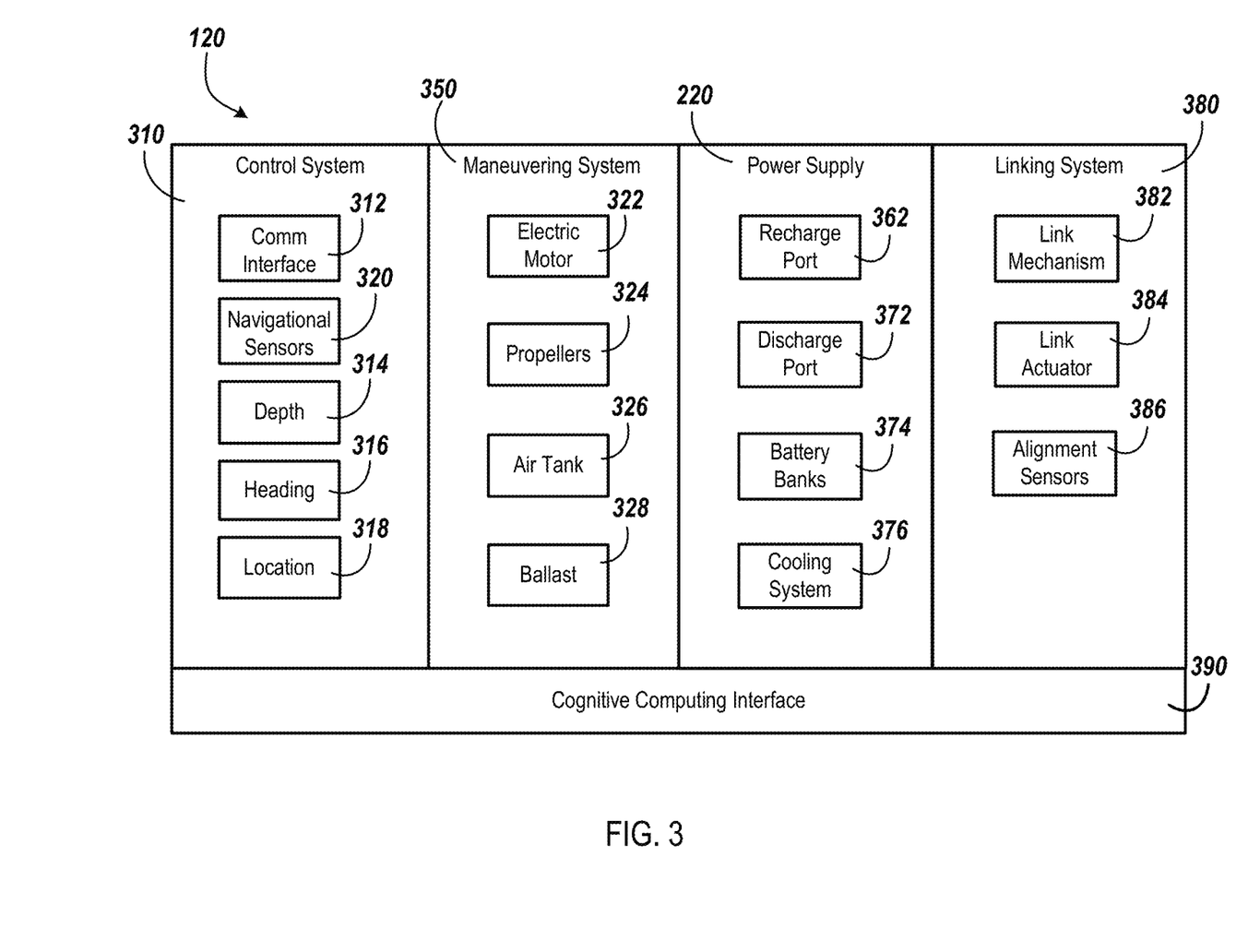
FIG. 3 is a diagram of an example control system of a watercraft.

FIG. 3 is a block diagram of an example watercraft 120. The watercraft 120 includes a control system 310, a maneuvering system 350, a power supply 220, and a linking system 380. The control system 310, the maneuvering system 350, the power supply 220, and the linking system 380 are each communicably connected to a cognitive computing interface 390. The interface 390 is configured to transmit data to and receive data from each of the control system 310, the maneuvering system 350, the power supply 220, and the linking system 380. The interface 390 facilitates communication between each of the control system 310, the maneuvering system 350, the power supply 220, and the linking system 380.

As the watercraft 120 transits through water, a control system 310 of the watercraft 120 can control a maneuvering system 350 of the watercraft 120. The maneuvering system 350 of the watercraft 120 can include electric motor 322, propellers 324, air tanks 326, ballast tanks 328, etc. The maneuvering system 350 of the watercraft 120 can control the direction of travel of the watercraft 120, the depth of the watercraft 120, etc. For example, the maneuvering system 350 can be controlled to navigate the watercraft 120 around obstacles, to submerge and surface the watercraft 120, to change physical configurations of the watercraft 120, etc.

The control system 310 can receive data readings from sensors 320 associated with the watercraft 120. In some examples, these data readings are received in real-time. The data can include readings of environmental parameters, such as the location of the watercraft 120, the water temperature, water salinity, water pressure, obstacles, etc. surrounding the watercraft 120. In some examples, the sensors 320 are coupled to the watercraft 120. For example, the sensors 320 can be coupled to the outside of the watercraft 120 and can travel with the watercraft 120. In some examples, the sensors 320 are located proximate to the watercraft 120. For example, the sensors can be placed along an expected path of the watercraft 120.

In some examples, the control system 310 can receive navigation instructions from the controller 230. In some examples, the control system 310 can generate navigation instructions based on input from the controller 230. For example, the controller 230 can transmit a destination location to the control system 310. The control system 310 can then generate navigation instructions that cause the watercraft 120 to transit from a current location to the destination location.

Based on the navigation instructions, the control system 310 can control the maneuvering system 350 of the watercraft 120 to navigate the watercraft 120 according to the navigation instructions. For example, the control system 310 can control the maneuvering system 350 to navigate the watercraft 120 to the rendezvous point 122 with the marine vessel 110.

The control system 310 can control the watercraft 120 according to navigation instructions. The navigation instructions can include depths 314, headings 316, locations 318, etc. For example, the navigation instructions can include a new depth for the watercraft 120. The control system 310 can control the maneuvering system 350 based on the new depth to raise or lower the watercraft 120 within a water column.

In some examples, the control system 310 can receive data readings from sensors 320 in real-time and determine navigation instructions in real-time. For example, the control system 310 may receive a data reading indicating weather conditions such as lightning, hurricanes, tropical storms, tornados, tsunamis, etc. Based on the data indicating the weather conditions, the control system 310 can determine new navigation instructions to steer the watercraft 120 away from the hurricane or dive to a depth that reduces an impact to the watercraft 120 from a storm.

In some examples, readings from the sensors 320 can indicate obstacles, such as ships, wreckage, reefs, shorelines, farms, etc. For example, the control system 310 can receive data readings from sensors 320 indicating that the watercraft 120 will be navigating into a reef and determine new navigation instructions to steer the watercraft 120 away from the reef.

The depth 314 indicates a depth in water of the watercraft 120. The depth 314 can be measured as a depth from the water surface, from the bottom of the ocean, etc. The depth 314 is determined by the control system 310, and is used to control the maneuvering system 350 to navigate the watercraft 120 in the water. In some examples, the depth 314 is determined by the control system 310 using the sensors 320. For example, the control system 310 can determine the boundaries of a strong current in a direction opposite to the current heading of the watercraft, and determine that if the watercraft 120 sank in depth by five feet, the watercraft would be able to steer out of the strong current.

The control system 310 can use machine learning models. These models may be models which accept sensor data collected by cameras and/or other sensors as inputs. The machine learning models may use any of a variety of models such as decision trees, linear regression models, logistic regression models, neural networks, classifiers, support vector machines, inductive logic programming, ensembles of models (e.g., using techniques such as bagging, boosting, random forests, etc.), genetic algorithms, Bayesian networks, etc., and can be trained using a variety of approaches, such as deep learning, perceptrons, association rules, inductive logic, clustering, maximum entropy classification, learning classification, etc. In some examples, the machine learning models may use supervised learning. In some examples, the machine learning models use unsupervised learning.

The communications systems include networks over which data regarding location of the watercraft 120, power supply power level, etc. The communications system can be a wired connection or a wireless connection. For example, the communications system can be implemented over a wireless network such as a cellular or satellite network to share power supply power level data with marine vessel 110. The communications system allows the watercraft 120 to communicate with systems such as central control centers that monitor and forecast power supply levels of various watercraft.

The heading 316 indicates a direction of motion of the watercraft 120. The heading 316 can be determined by the control system 310, and can be used to control the maneuvering system 350 to navigate the watercraft 120 through the water. In some examples, the heading 316 is set by the control system 310 based on data from the sensors 320. For example, the control system 310 can determine the location of a hurricane along the course of travel of the watercraft 120, and determine that if the watercraft 120 changed heading by three degrees toward North, the watercraft would be able to steer around the hurricane.

The location 318 can include a current location, a destination location, or both, of the watercraft 120. The location 318 can include global coordinates, an address, etc. The location 318 is determined by the control system 310, and can be used to control the maneuvering system 350 to navigate the watercraft 120 through the water. In some examples, the location 318 is determined by the control system 310 using data from the sensors 320.

The interface 390 is configured to transmit data to and receive data from the control system 310 and the maneuvering system 350 such that the navigation instructions determined by the control system 310 are used to control the maneuvering system 350.

The control system 310 can direct the vertical motion and positioning of the watercraft 120. The control system 310 can control the depth of the watercraft 120 within a water column, the speed of the watercraft 120 within the body of water 101, and the ascent and/or descent of the watercraft 120 within the body of water 101, among other movements of the watercraft 120. The control system 310 can control the motion and positioning of the watercraft 120 by generating control signals for the maneuvering system 350.

The control system 310 controls the maneuvering system 350 to steer the watercraft 120. The control system 310 is communicatively coupled to the maneuvering system 350. In some implementations, the control system 310 is coupled to the maneuvering system 350 through communication buses within environmentally sealed conduits. In some implementations, the control system 310 transmits control signals to the maneuvering system 350 wirelessly through various wireless communications methods, such as RF, sonic transmission, electromagnetic induction, etc.

The control system 310 can determine a path through the water and corresponding control signals for the maneuvering system 350 locally. In some implementations, the control system 310 is communicatively coupled to sensors and a communications interface 312, and uses data collected by the sensors and communications interface 312 to navigate. In some implementations, the control system 310 is coupled to the sensors and communications interface 312 through communication buses within environmentally sealed conduits. In some implementations, the control system 310 receives sensor data from the sensors and communications interface 312 wirelessly through various wireless communications methods, such as RF, sonic transmission, electromagnetic induction, etc.

In some implementations, the control system 310 communicates with a remote server, e.g., controller 230, through the sensors and communications interface 312 to receive new headings. For example, the sensors and communications interface 312 can transmit position data of the watercraft 120 to a remote server, which processes the data and transmits a new heading to the control system 310. The control system 310 can receive the new heading, process the data, and generate updated control signals for the maneuvering system 350. In some implementations, the control system 310 communicates with a remote server through the sensors and communications interface 312 to receive new control signals for the maneuvering system 350.

In some implementations, the control system 310 can generate updated control signals for the maneuvering system 350 locally, without communicating with a remote server. For example, the control system 310 can receive data from the sensors and communications interface 312, process the data to determine a new heading, and generate updated control signals for the maneuvering system 350. In some implementations, the control system 310 can provide navigation signals to the watercraft 120 without the use of GPS. For example, the control system 310 can navigate the watercraft 120 using positioning data collected by the sensors and communications interface 312.

The maneuvering system 350 receives input from multiple sources, including the control system 310. For example, the maneuvering system 350 can receive a control signal from the control system 310. In some examples, the maneuvering system 350 can receive the one or more navigation instructions determined by the control system 310 and determine a control signal that controls the components of the maneuvering system 350. In some examples, the cognitive computing interface 390 receives the one or more navigation instructions determined by the control system 310 and determines a control signal for the maneuvering system 350.

In some examples, the maneuvering system 350 includes a controller that controls all components of the maneuvering system 350. For example, the maneuvering system 350 can include a central controller that transmits control signals to each of the electric motor 322, the propellers 324, the air tank 326, and the ballast tanks 328. In some examples, the maneuvering system 350 includes a controller for each component of the maneuvering system 350. For example, the maneuvering system 350 can include a separate controller that transmits control signals to each of the electric motor 322, the propellers 324, the air tank 326, and the ballast tanks 328.

In some implementations, the maneuvering system 350 includes a set of propellers 324. In some implementations, the propellers are two offset propellers 324 which allow the watercraft 120 to be steered, as well as change depth. The propellers 324 can be positioned on the exterior of the watercraft 120 that are controlled to propel the watercraft 120 through the water. In some examples, the propellers can be independently controlled. In some examples, the propellers are controlled by the maneuvering system 350 to steer the watercraft 120. The propellers can be controlled to change the direction, speed, etc. of the watercraft 120. In some examples, the maneuvering system can include one or more rudders for controlling the direction of travel of the watercraft 120.

The propellers 324 can be controlled by the maneuvering system 350 based on the one or more navigation instructions determined by the control system 310. For example, the cognitive computing interface 390 can receive the one or more navigation instructions determined by the control system 310 and generate a control signal for the propellers 324. In some examples, the maneuvering system 350 can receive the one or more navigation instructions and generate a control signal for the propellers 324.

The air tank 326 can be a tank filled with air that is used to blow water out of the watercraft 120. In some examples, the air tank 326 contains compressed air that forces water out of the ballast tanks 328. The air tank 326 can push water through valves of the watercraft 120 to increase the buoyancy of the watercraft 120. In some examples, the air tank 326 can be controlled by the maneuvering system 350 based on the one or more navigation instructions determined by the control system 310. For example, the air tank 326 can be controlled to force water out of the ballast tanks 328 based on a change in depth that decreases the depth of the watercraft 120.

The ballast tanks 328 can include one or more compartments within the watercraft 120 that holds water to provide stability for the watercraft. In some examples, the ballast tanks 328 can be controlled by the maneuvering system 350 based on the one or more navigation instructions determined by the control system 310. For example, the ballast tanks 328 can be pumped with water to decrease buoyancy of the watercraft 120 if the depth 314 determined by the control system 310 requires an increase in depth of the watercraft 120. In some examples, a ballast located at one part of the watercraft can be filled with water in order to increase the depth of that part of the watercraft, while other parts of the watercraft might not change depth. In this way, the ballast tanks 328 can be used to tilt or rotate the watercraft 120.

The power supply 220 includes battery banks 374. The battery banks can include tens, hundreds, or even thousands of batteries. The batteries can include, for example, lead batteries, lithium-ion batteries, fuel cells, etc. In some examples, the power supply 220 includes a first set of batteries for self-propulsion of the watercraft 120 and includes a second set of batteries for charging marine vessels. In some examples, instead of or in addition to batteries, the power supply 220 can include electrical motors. The watercraft 120 can directly power the electrical motors in addition to or instead of charging the batteries.

The power supply 220 includes a cooling system 376. The cooling system 376 can include a system that circulates a coolant around the battery banks 274. For example, the power supply 220 can include channels in between batteries of the battery banks. Coolant can be circulated through the channels. In some examples, the coolant flowing through the cooling system 376 is seawater. In some examples, the coolant flowing through the cooling system 376 is a fluid, such as freshwater, that is in turn cooled by seawater. The coolant can be circulated, e.g., using circulation pumps. In some examples, the cooling system 376 can include a scoop system for scooping seawater from the body of water 101 into the watercraft 120. The scooped seawater then cools the battery banks 374 directly or indirectly. The battery banks 376 can be enclosed in protective coverings in order to protect the batteries from the coolant.

The power supply 220 includes a recharge port 362 and a discharge port 372. The recharge port 362 is a port through which the battery banks 374 can be recharged, e.g., by the charging station 150. The discharge port 372 is a port through which the battery banks 274 can provide electrical energy to a power supply of another vessel. For example, electrical energy can be transferred from the battery banks 274 through the discharge port 372 to the power supply of the marine vessel 110, the watercraft 130, the drone 140, and/or another vessel or device.

In some examples, the discharge port 372 outputs electrical energy to a cable, e.g., cable 102, that can be coupled to the charge port of the marine vessel 110. In some examples, the cable 102 can extend from the watercraft 120 to the marine vessel 110 above the waterline. In some examples, the cable 102 can have water resistant properties and can extend from the watercraft 120 to the marine vessel 110 below the waterline. The cable 102 can conduct electrical energy from the power supply 220 to the power supply 210. In some examples, the cable 102 can include one or more conduits for transferring data from the watercraft 120 to the marine vessel 110. The conduits can be used for communication between the control system 310 of the watercraft 120 and a control system of the marine vessel 110.

In some examples, the cable 102 can be connected to and/or supported by the linking system 380. The linking system 380 includes link mechanisms 382, link actuators 384, and alignment sensors 386. The linking system 380 can be used to mechanically couple the watercraft 120 with a marine vessel 110 or with multiple marine vessels 110. The link mechanisms 382 can include, for example, any combination of pins, slots, fasteners, latches, bolts, magnets, clamps, hooks, booms, funnels, probes, drogues, tow lines etc. The link mechanism can be rigid or flexible. The link mechanisms 382 can be operated by the link actuators 384. For example, a link actuator 384 can include a motor that causes the link mechanism 382 to attach to a link mechanism of a marine vessel 110.

In some examples, the link mechanism 382 can be an automated boom system. The boom system can include a rigid, telescoping boom, or tube, with a stabilizer. The link actuator 384 can cause the boom to extend from the watercraft 120 to the marine vessel 110 to insert the boom into a charging port of the marine vessel 110. In some examples, a charging cable can be connected to the boom. Thus, when the boom mechanically connects to the marine vessel 110, the charging cable, e.g., cable 102, connects the power supply 220 to the power supply 210 in order to charge the power supply 210. In some examples, the boom is a dynamically moving boom with many degrees of freedom. Thus, the boom can adjust to compensate for wave motion in order to transfer little or no force between the watercraft 120 and the marine vessel 110 through the boom.

In some examples, the link mechanism 382 can include a wire or structural cable that can be suspended between the watercraft 120 and the marine vessel 110 under tension. For example, the wire can be projected from the watercraft 120 to the marine vessel 110, e.g., using an automatic line thrower. When the wire connects to the marine vessel 110, the link actuator 384 can apply tension to the wire. The tensioned wire can support the electrical cable, e.g., cable 102 spanning between the marine vessel 110 and the watercraft 120 while the watercraft 120 charges the marine vessel 110.

In some examples, the link mechanism 382 can include a tow line. The tow line can be extended between the watercraft 120 and the marine vessel 110. In some cases, while the watercraft 120 charges the marine vessel 110, the watercraft 120 can tow the marine vessel 110 behind the watercraft 120 using the tow line. In some cases, while the watercraft 120 charges the marine vessel 110, the marine vessel 110 can tow the watercraft 120 behind the marine vessel 110 using the tow line.

In some examples, the link mechanism 382 is a standardized link mechanism that can permit mechanical coupling between the watercraft 120 and multiple different types of vessels. For example, the link mechanism 382 can permit mechanical coupling between the watercraft 120 and the watercraft 130, between the watercraft 120 and the marine vessel 110, and between the watercraft 120 and the charging station 150.

In some examples, the link actuator 384 can receive control signals from the control system 310 through the cognitive computing interface. For example, the control system 310 can send control signals to the link actuator 384 causing the link actuator 384 to extend the link mechanism 382 toward the marine vessel or retract the link mechanism 382 from the marine vessel 110. The control system 310 can also send control signals to the link actuator causing the link actuator 384 to connect the link mechanism 382 to a corresponding link mechanism of the marine vessel 110, or to disconnect the link mechanism 382 from the corresponding link mechanism of the marine vessel 110. In some examples, the link actuator 384 can use a force feedback loop to maintain low force connection in rough seas.

In some examples, the sensors 320 may detect changes in weather conditions, e.g., high winds, heavy seas, etc. In response to detecting dangerous weather conditions, the control system 310 can send a control signal to the link actuator 384 that causes the link actuator 384 to disengage the link mechanism 382 from the link mechanism of the marine vessel. In some examples, the link mechanism 382 is a load limiting connection. If the link mechanism 382 experiences forces or loads greater than permissible load levels, the link mechanism 382 can disengage from the marine vessel 110 and retract.

The alignment sensors 386 can be used to align the watercraft 120 with the marine vessel 110. Data generated by the alignment sensors 386 can be used for detecting the marine vessel 110 and determining a relative position between the watercraft 120 and the marine vessel 110. For example, the alignment sensors can include one or more cameras or sonar sensors that can detect the presence of a marine vessel 110 and determine a relative position and proximity of the marine vessel 110.

In some examples, the control system 310 can control the maneuvering system 350 based on sensor data from the alignment sensors 386. For example, the control system 310 can receive sensor data from the alignment sensors 386 indicating that a marine vessel 110 is positioned at a proximity from the watercraft 120 that is greater than a threshold proximity for linking. The control system 310 can control the maneuvering system 350 to cause the watercraft 120 to move closer to the marine vessel 110 to align the link mechanism 382 with a corresponding link mechanism of the marine vessel 110. When the data from the alignment sensors 386 indicate that the marine vessel 110 is positioned within the threshold proximity, and that the link mechanisms are aligned, the control system can control the link actuator 384 to cause the link mechanism 382 to link to a link mechanism of the marine vessel 110.

In some examples, the control system 310 can communicate with marine vessel 110 using the communications interface 312. For example, when the watercraft 120 approaches a marine vessel 110, the control systems of the watercraft 120 can communicate with the marine vessel 110 in order to align their respective link mechanisms.

In some examples, the controller 230 or the control system 310 of each watercraft 120 can control the respective maneuvering systems in order to align the link mechanisms of the watercraft 120 with a link mechanism of the marine vessel 110. For example, the controller or the control system 310 can determine to align the watercraft 120 with the marine vessel 110 in accordance with alignment criteria.

Alignment criteria can include, for example, a maximum threshold proximity between the watercraft 120 and the marine vessel 110, a maximum offset angle between the watercraft 120 and the marine vessel 110, etc. For example, the watercraft 120 may satisfy alignment criteria by the watercraft 120 being within a maximum threshold proximity to the marine vessel 110, by the watercraft 120 and marine vessel 110 both traveling at a speed that is below the maximum threshold speed through the water, by an offset angle between the watercraft 120 and marine vessel 110 being less than a maximum offset angle, etc.

When the watercraft 120 satisfies the alignment criteria, the control systems of the watercraft can control the respective linking system, causing the link mechanisms of the watercraft 120 to link to linking mechanisms of the marine vessel 110.

Figure 4:
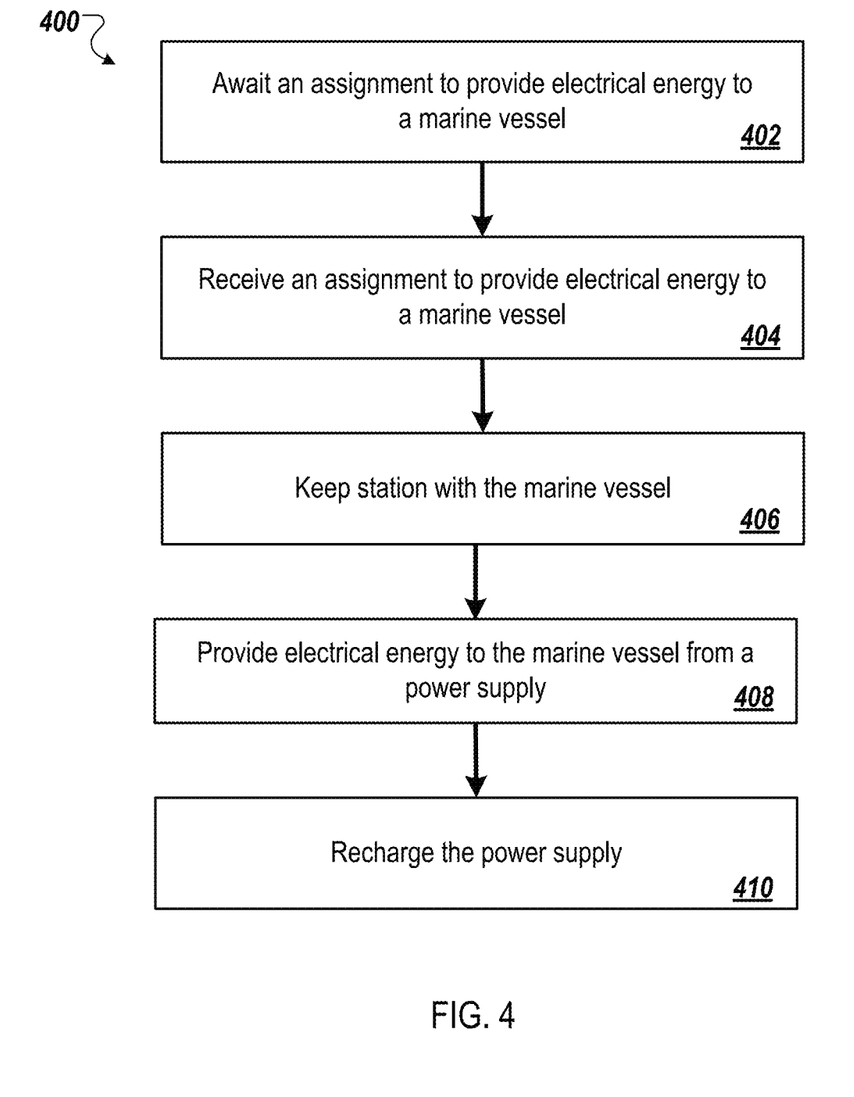
FIG. 4 is a flow diagram of an example process for controlling an autonomous seagoing power replenishment watercraft.

FIG. 4 is a flow diagram of an example process 400 for controlling an autonomous seagoing power replenishment watercraft. Briefly, the process 400 includes awaiting an assignment to provide electrical energy to a marine vessel (402); receiving an assignment to provide electrical energy to a marine vessel (404); keeping station with the marine vessel (406); providing electrical energy to the marine vessel from a power supply (408); and recharging the power supply (410).

In greater detail, the process 400 includes awaiting an assignment to provide electrical energy to a marine vessel (402). For example, in stage (A) of FIG. 1, the watercraft 120 awaits an assignment. The watercraft 120 can await the assignment while charging its power supply from the charging station 150 or after charging its power supply from the charging station 150.

The process 400 includes receiving an assignment to provide electrical energy to a marine vessel (404). For example, in FIG. 1 the watercraft 120 receives an assignment to provide electrical energy to the marine vessel 110. The marine vessel is traveling along route 111. In response to receiving the assignment, the watercraft 120 transits along path 121 to rendezvous point 122.

The process 400 includes keeping station with the marine vessel (406). For example, upon arriving at the rendezvous point 122, the watercraft 120 takes station on the marine vessel 110 and keeps station with the marine vessel 110. The watercraft 120 can keep station with the marine vessel 110 by matching the course and speed of the marine vessel 110 in order to maintain a consistent position relative to the marine vessel 110. The consistent position can be, for example, a position astern or abeam of the marine vessel 110.

The process 400 includes providing electrical energy to the marine vessel from a power supply (408). For example, the watercraft 120 provides electrical energy to the marine vessel 110 from a power supply 220. The watercraft 120 can electrically couple the power supply 220 to a power supply 210 of the marine vessel 110 through a cable 102. The watercraft 120 can charge the marine vessel 110 until the marine vessel 110 reaches a maximum threshold power level or until the watercraft 120 reaches a minimum threshold power level.

The process 400 includes recharging the power supply (410). For example, after charging the marine vessel 110, the watercraft 120 autonomously returns to the charging station 150 along the path 121. The watercraft 120 connects a recharge port to the charging station 150 in order to charge the power supply 220 from the charging station. The watercraft 120 can charge the power supply 220 until the power supply reaches a maximum threshold power level.

A number of implementations have been described. Nevertheless, it will be understood that various modifications may be made without departing from the spirit and scope of the disclosure. For example, various forms of the flows shown above may be used, with steps re-ordered, added, or removed.

Functional operations described in this specification may be implemented in digital electronic circuitry, or in computer software, firmware, or hardware, including the watercraft disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include radio communication networks, a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

The invention claimed is:

1. A system comprising:
a plurality of battery-powered marine vessels;
a plurality of watercraft, each watercraft of the plurality of watercraft including an electrical power supply that is rechargeable using a sustainable energy source, and being configured to operate in:
  a first mode in which the watercraft awaits an assignment to provide sustainably-sourced electrical energy to a marine vessel of the plurality of battery-powered marine vessels;
  a second mode in which the watercraft performs operations including:
    keeping station with an assigned battery-powered marine vessel; and
    providing the sustainably-sourced electrical energy to the assigned battery-powered marine vessel from the power supply; and
  a third mode in which the watercraft recharges the power supply from a sustainable energy source associated with a charging station; and
a controller configured to perform operations comprising:
  obtaining data indicating a planned travel route of a first battery-powered marine vessel and a battery specification of the first battery-powered marine vessel;
  determining, using the planned travel route and the battery specification, a battery charging requirement of the first battery-powered marine vessel;
  selecting, based on the battery charging requirement of the first battery-powered marine vessel, a first watercraft of the plurality of watercraft to provide the sustainably-sourced electrical energy to the first battery-powered marine vessel; and
  transmitting, to the first watercraft, an instruction indicating an assignment of the first watercraft to provide the sustainably-sourced electrical energy to the first battery-powered marine vessel of the plurality of battery-powered marine vessels wherein the first watercraft transitions between modes based upon receiving the instruction indicating the assignment.

2. The system of claim 1, wherein each watercraft is configured to transition from the first mode to the second mode upon receiving an instruction assigning the watercraft to provide the sustainably-sourced electrical energy to a battery-powered marine vessel.

3. The system of claim 1, wherein providing the sustainably-sourced electrical energy to the assigned battery-powered marine vessel comprises:
connecting a discharge port of the power supply to a charge port of the assigned battery-powered marine vessel;
determining that a power level of the power supply drops to a first threshold power level; and
in response to determining that the power level of the power supply drops to the first threshold power level, disconnecting the discharge port of the power supply from the charge port of the assigned battery-powered marine vessel.

4. The system of claim 1, wherein recharging the power supply from the charging station comprises:
autonomously navigating the watercraft to a location of the charging station;
connecting a charge port of the power supply to a discharge port of the charging station;
determining that a power level of the power supply rises to a second threshold power level; and
in response to determining that the power level of the power supply rises to the second threshold power level, disconnecting the charge port of the power supply from the discharge port of the charging station.

5. The system of claim 1, wherein each watercraft includes a linking system configured to couple a first link mechanism of the watercraft to a second link mechanism of the assigned battery-powered marine vessel while the watercraft provides the sustainably-sourced electrical energy to the assigned battery-powered marine vessel.

6. The system of claim 1, wherein the assigned battery-powered marine vessel is configured to tow the watercraft while the watercraft provides the sustainably-sourced electrical energy to the assigned battery-powered marine vessel.

7. The system of claim 1, wherein keeping station with the assigned battery-powered marine vessel includes maintaining a consistent relative position between the watercraft and the assigned battery-powered marine vessel as the marine vessel transits through a body of water based on sensor data from one or more sensors.

8. The system of claim 1, wherein the power supply includes a first battery bank configured to power the watercraft and a second battery bank configured to provide electrical energy to the assigned battery-powered marine vessel.

9. The system of claim 1, the operations comprising assigning the first watercraft to the first battery-powered marine vessel based on a power level of the power supply of the first watercraft.

10. The system of claim 1, the operations comprising:
tracking a location of each of the plurality of battery-powered marine vessels;
tracking a location of each watercraft; and
assigning the first watercraft to provide electrical energy to the first battery-powered marine vessel based on a current location of the first watercraft and a current location of the first battery-powered marine vessel.

11. The system of claim 1, the operations comprising transmitting, to the first watercraft, instructions to transit to a first location for rendezvous with the first battery-powered marine vessel.

12. The system of claim 1, operations comprising:
assigning a second watercraft to provide electrical energy to the first battery-powered marine vessel after the first watercraft provides electrical energy to the first battery-powered marine vessel;
determining a time duration for the first watercraft to provide electrical energy to the first battery-powered marine vessel;
predicting a location of the first battery-powered marine vessel at an end of the time duration; and
transmitting, to the second watercraft of the plurality of watercraft, an instruction to transit to a second location for rendezvous with the first battery-powered marine vessel, the second location being selected based on the predicted location of the first battery-powered marine vessel at an end of the time duration.

13. The system of claim 1, wherein the charging station comprises at least one of a waterborne solar powered charging station, a waterborne tidal powered charging station, or a waterborne wind powered charging station.

14. The system of claim 1, wherein each watercraft includes a wireless communication module configured to enable communication between the watercraft and the controller and to enable communication between the watercraft and the battery-powered marine vessels, the operations comprising transmitting the instruction to the wireless communication module of the first watercraft.

15. The system of claim 1, wherein:
the battery specification comprises a battery discharge rate of the first battery-powered marine vessel,
determining the battery charging requirement comprises determining, using the battery discharge rate, a location along the planned travel route at which the first battery-powered marine vessel is to be charged, and
the instruction transmitted to the first watercraft includes navigation instructions to the determined location along the planned travel route.

16. The system of claim 1, wherein:
the battery specification comprises a battery power level of the first battery-powered marine vessel,
determining the battery charging requirement comprises determining, using the battery power level, an amount of sustainably-sourced electrical energy to be provided to the first battery-powered marine vessel, and
selecting the first watercraft to provide the sustainably-sourced electrical energy to the first battery-powered marine vessel comprises selecting the first watercraft based on the power supply of the first watercraft having a power level that is sufficient to provide the determined amount of sustainably-sourced electrical energy to the first battery-powered marine vessel.

17. The system of claim 1, wherein:
the battery specification comprises a battery charge rate of the first battery-powered marine vessel,
determining the battery charging requirement comprises determining, using the battery charge rate, a time duration of charging for the first battery-powered marine vessel, and
the instruction transmitted to the first watercraft includes instructions to provide the sustainably-sourced electrical energy to the first battery-powered marine vessel for the determined time duration.

18. The system of claim 1, operations comprising:
obtaining data indicating planned travel routes of each battery-powered marine vessel of the plurality of battery-powered marine vessels;
determining, for each battery-powered marine vessel of the plurality of battery-powered marine vessels, a predicted location along the respective planned travel route where the battery-powered marine vessel will require provision of electrical energy; and
selecting, for provisioning of electrical energy from one of the plurality of watercraft, the first battery-powered marine vessel from among the plurality of battery-powered marine vessels based on prioritization criteria.

19. The system of claim 18, wherein the prioritization criteria includes a perishability of cargo carried by the first battery-powered marine vessel.

20. A computer-implemented method comprising:
obtaining data indicating a planned travel route and a battery specification of a first battery-powered marine vessel of a plurality of battery-powered marine vessels;
determining, using the planned travel route and the battery specification, a battery charging requirement of the first battery-powered marine vessel;
selecting, based on the battery charging requirement of the first battery-powered marine vessel, a first watercraft of a plurality of watercraft to provide sustainably-sourced electrical energy to the first battery-powered marine vessel; and
transmitting, to the first watercraft, an instruction indicating an assignment of the first watercraft to provide the sustainably-sourced electrical energy to the first battery-powered marine vessel,
wherein each watercraft of the plurality of watercraft includes an electrical power supply that is rechargeable using a sustainable energy source and is configured to operate in:
   a first mode in which the watercraft awaits an assignment to provide the sustainably-sourced electrical energy to a marine vessel of the plurality of battery-powered marine vessels;
   a second mode in which the watercraft performs operations including:
      keeping station with an assigned battery-powered marine vessel; and
      providing the sustainably-sourced electrical energy to the assigned battery-powered marine vessel from the power supply; and
   a third mode in which the watercraft recharges the power supply from a sustainable energy source associated with a charging station wherein the first watercraft transitions between modes based upon receiving the instruction indicating the assignment.

* * * * *